United States Patent
Kelly et al.

(10) Patent No.: US 10,447,800 B2
(45) Date of Patent: Oct. 15, 2019

(54) NETWORK CACHE DEDUPLICATION ANALYTICS BASED COMPUTE CLUSTER LOAD BALANCER

(71) Applicant: Dell Products L.P., Round Rock, TX (US)

(72) Inventors: John Kelly, Dooradoyle (IE); Yinglong Jiang, Murroe (IE)

(73) Assignee: Dell Products L.P., Round Rock, TX (US)

(*) Notice: Subject to any disclaimer, the term of this patent is extended or adjusted under 35 U.S.C. 154(b) by 412 days.

(21) Appl. No.: 14/972,549

(22) Filed: Dec. 17, 2015

(65) Prior Publication Data

US 2017/0180503 A1    Jun. 22, 2017

(51) Int. Cl.
*H04L 29/06* (2006.01)
*H04L 29/08* (2006.01)
*G06F 9/455* (2018.01)

(52) U.S. Cl.
CPC ...... *H04L 67/2842* (2013.01); *G06F 9/45558* (2013.01); *H04L 67/1008* (2013.01); *H04L 67/1097* (2013.01); *G06F 2009/45595* (2013.01)

(58) Field of Classification Search
CPC ....... H04L 51/38; H04L 67/10; H04L 67/142; H04L 67/2842; H04L 67/145
USPC ........................................................ 709/206
See application file for complete search history.

(56) References Cited

U.S. PATENT DOCUMENTS

| | | | |
|---|---|---|---|
| 2010/0275199 A1* | 10/2010 | Smith ................ | G06F 9/45533 718/1 |
| 2011/0023114 A1* | 1/2011 | Diab ..................... | G06F 9/4856 726/22 |
| 2011/0314155 A1* | 12/2011 | Narayanaswamy .. | G06F 9/4856 709/226 |
| 2012/0226866 A1* | 9/2012 | Bozek ................. | G06F 9/45558 711/122 |
| 2013/0033981 A1* | 2/2013 | Droux .................. | H04L 45/245 370/228 |
| 2013/0166724 A1* | 6/2013 | Bairavasundaram ....... G06F 9/5016 709/226 |
| 2013/0329584 A1* | 12/2013 | Ghose .................. | H04L 45/586 370/252 |

(Continued)

OTHER PUBLICATIONS

John Kelly et al., U.S. Appl. No. 14/789,852, filed Jul. 1, 2015, entitled Compute Cluster Load Balancing Based on Memory Page Contents.

(Continued)

*Primary Examiner* — Moustafa M Meky
*Assistant Examiner* — Elizabeth Kassa
(74) *Attorney, Agent, or Firm* — Terrile, Cannatti & Chambers; Stephen A. Terrile

(57) ABSTRACT

A system, method, and computer-readable medium for performing a virtualized network environment cache control operation, comprising: analyzing network traffic of a plurality of virtual machines executing on a plurality of hosts within the virtualized network environment, each of the plurality of hosts comprising a network cache; identifying whether more than one virtual machine includes a similar network traffic pattern; and, configuring a first virtual machine and a second virtual machine to executing on a common host, the first virtual machine and the second virtual machine having the similar network pattern.

15 Claims, 4 Drawing Sheets

(56) References Cited

U.S. PATENT DOCUMENTS

| | | | |
|---|---|---|---|
| 2014/0223122 A1* | 8/2014 | Butt | G06F 9/5088 |
| | | | 711/162 |
| 2014/0280884 A1* | 9/2014 | Searle | H04L 43/0864 |
| | | | 709/224 |
| 2015/0146523 A1* | 5/2015 | Yang | H04L 45/306 |
| | | | 370/230 |
| 2015/0358248 A1* | 12/2015 | Saha | H04L 43/0817 |
| | | | 709/226 |
| 2016/0359705 A1* | 12/2016 | Parandehgheibi | H04L 63/1425 |
| 2016/0380865 A1* | 12/2016 | Dubal | H04L 43/10 |
| | | | 709/224 |

OTHER PUBLICATIONS

John Kelly et al., U.S. Appl. No. 14/789,855, filed Jul. 1, 2015, entitled Compute Cluster Load Balancing Based on Disk I/O Cache Contents.

* cited by examiner

NETWORK CACHE DEDUPLICATION ANALYTICS BASED COMPUTE CLUSTER LOAD BALANCER

BACKGROUND OF THE INVENTION

Field of the Invention

The present invention relates to information handling systems. More specifically, embodiments of the invention relate to cache control in a virtualized network environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to group clusters of physical server type information handling systems in software-defined data centers to provide resiliency and load balancing for virtualized workloads. Each information handling system in a cluster is referred to as a host or node. One issue with clusters relates to load-balancing of the information handling systems in the clusters. It is known to perform a load-balancing operation by performing a resource utilization assessment operation which assesses resource utilization information of hardware resources for each information handling system in the cluster. This resource utilization information can include information relating to one or more of network, memory, disk space and IO utilization information. The load-balancing operation migrates workloads to underutilized nodes. However, often the resource utilization assessment operation only assesses utilization information as an absolute value (such as a percentage of total resources utilized) and does not perform any analytics on the utilization information. FIG. 1, labeled Prior Art, shows an example of virtual machine allocation within a virtualized network environment where caching is used for some network packets.

SUMMARY OF THE INVENTION

A system, method, and computer-readable medium are disclosed for performing a virtualized network environment cache control operation, comprising: analyzing network traffic of a plurality of virtual machines executing on a plurality of hosts within a virtualized network environment, each of the plurality of hosts comprising a network cache; identifying whether more than one virtual machine includes a similar network traffic pattern; and, configuring a first virtual machine and a second virtual machine to execute on a common host, the first virtual machine and the second virtual machine having the similar network pattern.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
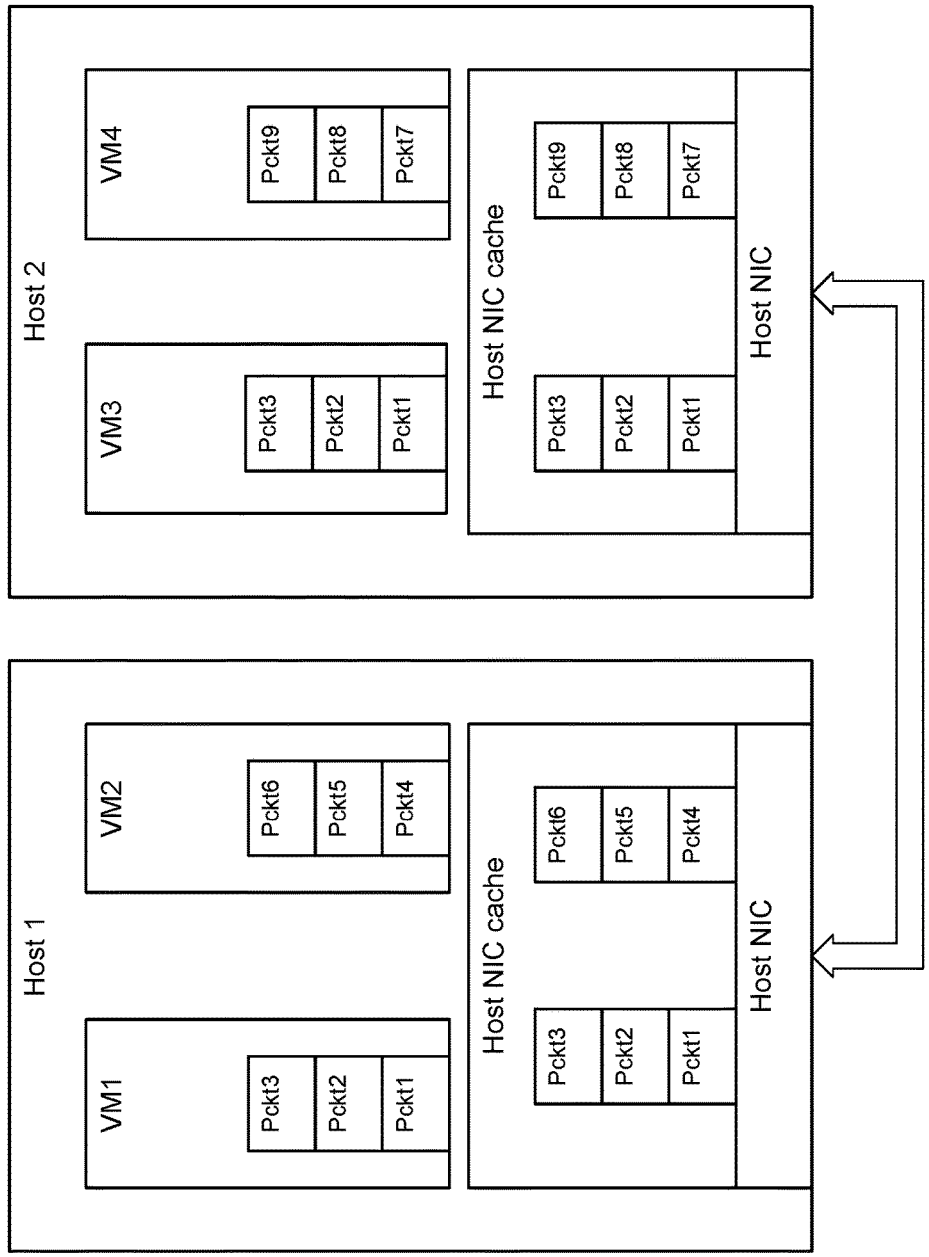
FIG. 1, labeled Prior Art, shows an example of virtual machine allocation within a virtualized network environment.

A system, method, and computer-readable medium are disclosed for performing a virtualized network environment cache control operation which includes an analytics operation to consolidate virtual machines within the virtualized network environment. The virtualized network environment cache control operation re-allocates virtual machines in a cluster of physical information handling system nodes to maximize the caching of network traffic being transmitted and received by those machines. Virtual machines that have similar network traffic patterns provide an opportunity for improved caching performance and therefore are consolidated onto the same nodes. For virtualized network environments where network resource utilization is at least one reason for resource bottleneck, the virtualized network environment cache control operation provides an increased density of virtual machines per node. When performing the virtualized network environment cache control operation, packet-inspection and caching occurs on each node in the first instance and a cluster level appliance performs an analytics operation on the cache of each node to assess whether virtual machine re-allocation would result in increased cache usage. Based upon the analysis, the virtualized network environment cache control operation re-allocates virtual machines within the virtualized network environment thereby increasing per node virtual machine density. Such a virtualized network environment cache control operation increases the opportunity for caching of substantially identical network packets onto at least one cluster node, thus resulting in increased per-node virtual machine density.

Embodiments of the disclosure include a recognition that it would be desirable to perform analytics on utilization information when performing a load-balancing operation. In various embodiments, the analytics operations include analyzing the content of network traffic as a criterion. Embodiments of the disclosure appreciate that network traffic deduplication techniques are based on network packet inspection and caching. Additionally, embodiments of the disclosure appreciate that without maximizing consolidation of virtual machines (VMs) that generate similar network traffic, a sub-maximal number of VMs per node will be achieved. Embodiments of the disclosure appreciate that by locating virtual machines on hosts that make optimal usage of the cache of the host, more network traffic can be cached by the host and thus less network traffic needs to travel on the network.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
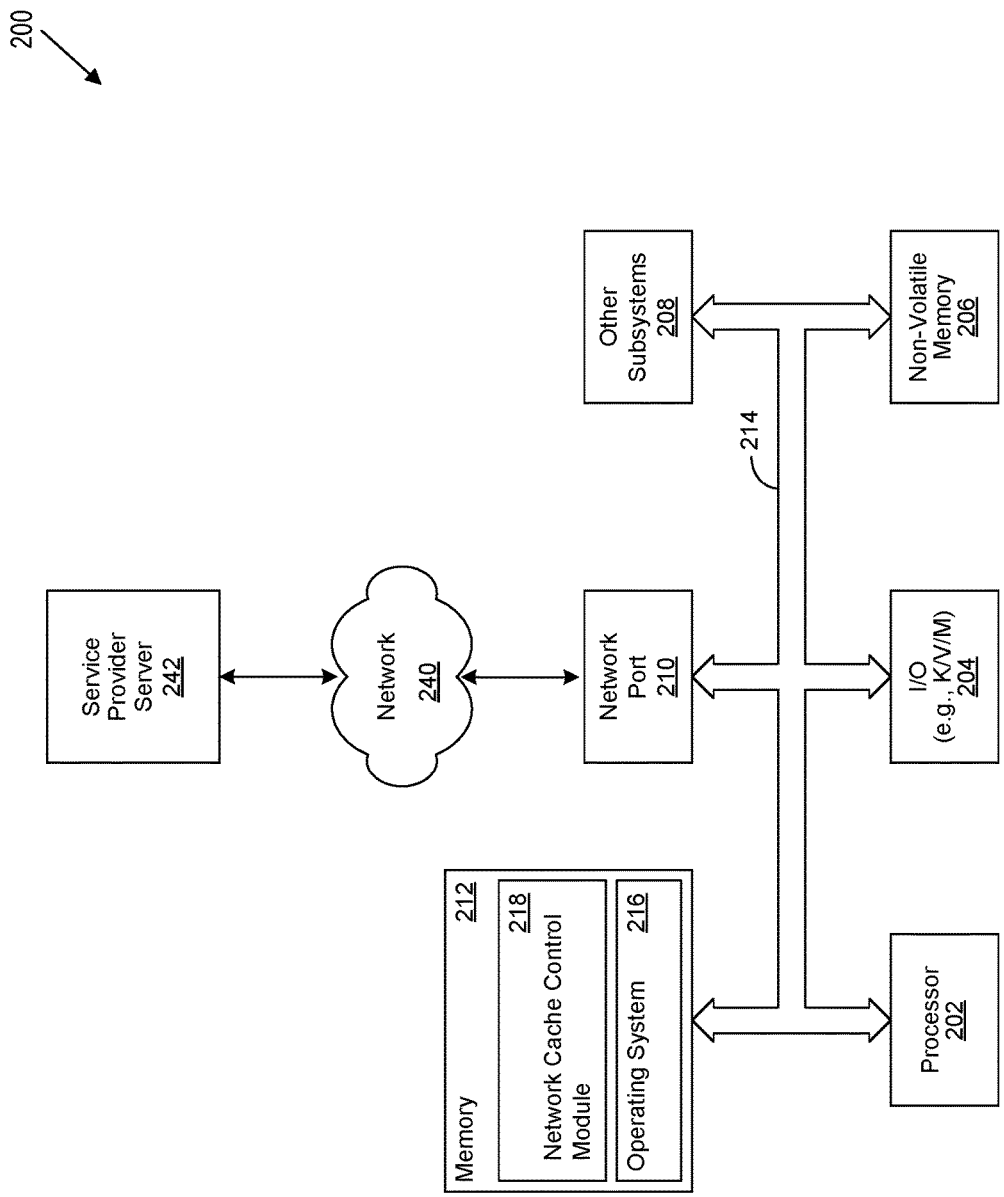
FIG. 2 shows a general illustration of components of an information handling system as implemented in the system and method of the present invention.

FIG. 2 is a generalized illustration of an information handling system 200 that can be used to implement the system and method of the present invention. The information handling system 200 includes a processor (e.g., central processor unit or "CPU") 202, input/output (I/O) devices 204, such as a display, a keyboard, a mouse, and associated controllers, a hard drive or disk storage 206, and various other subsystems 208. In various embodiments, the information handling system 200 also includes network port 210 operable to connect to a network 240, which is likewise accessible by a service provider server 242. The information handling system 200 likewise includes system memory 212, which is interconnected to the foregoing via one or more buses 214. System memory 212 further comprises operating system (OS) 216 and in various embodiments may also comprise network cache control module 218.

The virtualized network cache control module 218 performs a virtualized network environment cache control operation which includes an analytics operation to consolidate virtual machines within the virtualized network environment. The virtualized network environment cache control operation re-allocates virtual machines in a cluster of physical information handling system nodes to maximize the caching of network traffic being transmitted and received by those machines. Virtual machines that have similar network traffic patterns provide an opportunity for improved caching performance and therefore are consolidated onto the same nodes. In certain embodiments, similar network patterns are determined using analytics performed on the basis that the cache is a read-cache for traffic within a cluster of hosts receiving the traffic. On that basis, virtual machines may be consolidated onto the same host based on the number of identical packets that virtual machines are receiving. Consolidation occurs to ensure that virtual machine placement minimizes the cache usage, thereby minimizing network traffic. For the purposes of this disclosure, minimizing the cache usage refers to optimizing cache usage to minimize overall cache usage based on existing cache contents by maximizing sharing. Such an operation frees up more cache space for caching of additional traffic. Accordingly, for the purposes of this disclosure, minimizing cache usage is effectively equivalent to maximizing cache sharing.

For virtualized network environments where network resource utilization is at least one reason for resource bottleneck, the virtualized network environment cache control operation provides an increased density of virtual machines per node. When performing the virtualized network environment cache control operation, packet-inspection and caching occurs on each node in the first instance and a cluster level appliance performs an analytics operation on the cache of each node to assess whether virtual machine re-allocation would result in increased cache usage. Based upon the analysis, the virtualized network environment cache control operation re-allocates virtual machines within the virtualized network environment thereby increasing per node virtual machine density. Such a virtualized network environment cache control operation increases the opportunity for caching of substantially identical network packets onto at least one cluster node, thus resulting in increased per-node virtual machine density. In certain embodiments, substantially identical network packets comprise network packets having identical payloads while possibly having differing header information such as header source information, header destination information, etc. For the purposes of this disclosure a network packet may be defined as a formatted unit of data carried by a packet switched network.

Figure 3:
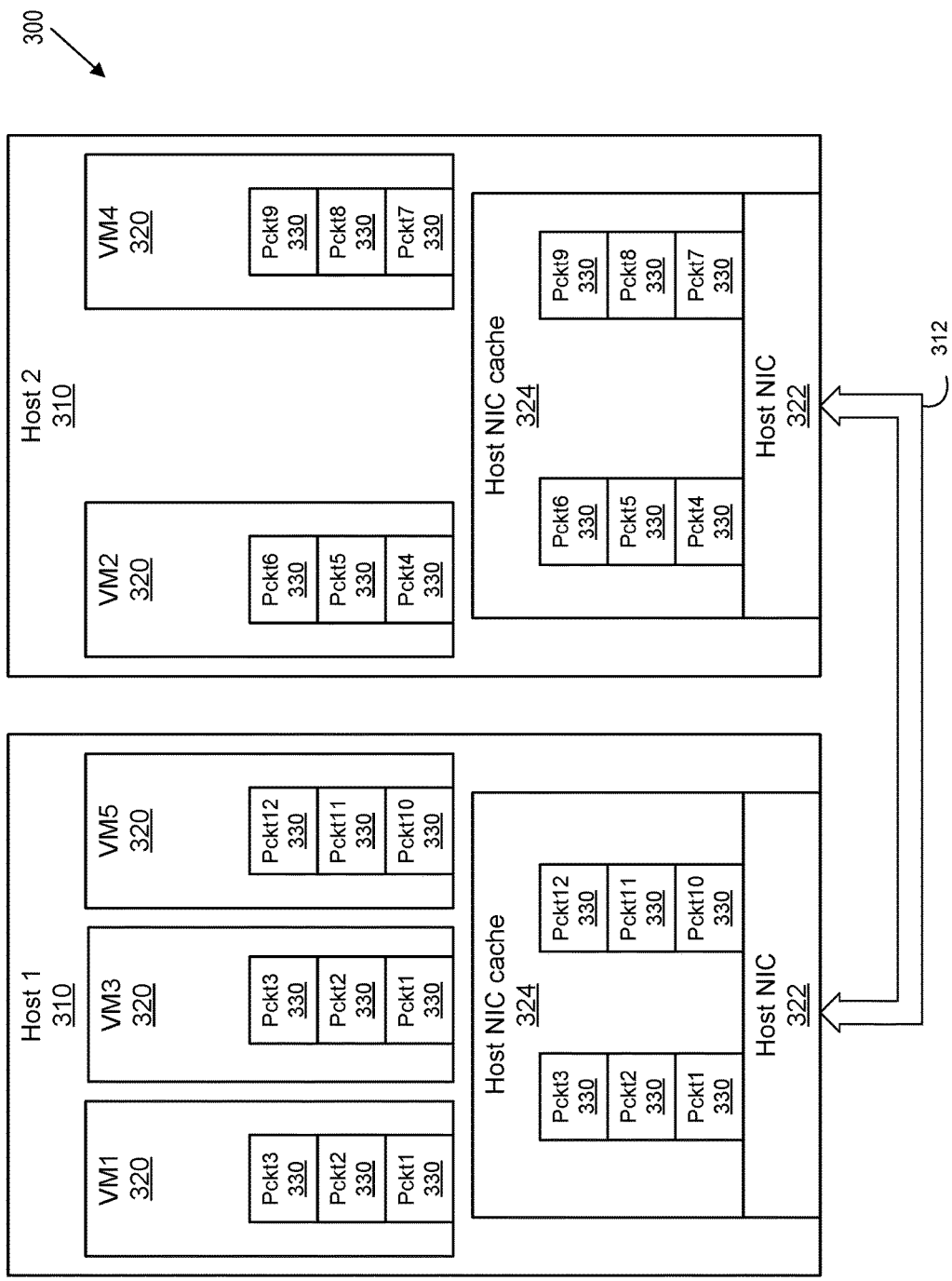
FIG. 3 shows a block diagram of a virtualized network environment in which a cache control operation is performed.

FIG. 3 shows a block diagram of a virtualized network environment 300 in which a cache control operation has been performed. More specifically, the virtualized network environment 300 includes a plurality of hosts 310 (Host 1, Host 2) communicating via network connectivity 312. Each host includes a plurality of virtual machines 320 as well as a network interface controller (NIC) 322. Each host also includes an associated host NIC cache 324. For example Host 1 includes virtual machines VM1, VM3 and VM5. Host 2 includes virtual machines VM2 and VM4. Each virtual machine 320 communicates via network packets. Each virtual machine 320 includes a plurality of network packets 330 that result from network read activity. For example, virtual machine VM1 includes network packets Pckt1, Pckt2 and Pckt3, virtual machine VM3 includes network packets Pckt1, Pckt2 and Pckt3, and virtual machine VM5 includes network packets Pckt10, Pckt11 and Pckt12. Also, for example, virtual machine VM2 includes network packets Pckt4, Pckt5 and Pckt6 and virtual machine VM4 includes network packets Pckt7, Pckt8 and Pckt9.

For example purposes, the virtualized network environment 300 started off being configured as the virtualized network environment shown in FIG. 1. Next, a cache control operation was performed on the virtualized network environment shown in FIG. 1 resulting in the virtualized network environment 300. Because a cache control operation was performed within the environment, the Host NIC cache 324 of Host 1 is more efficiently utilized. More specifically, because VM1 and VM3 are communicating using substantially similar packets (i.e., packets having identical payloads), the Host NIC cache 324 of Host 1 need only cache one version of the packets Pckt1, Pckt2 and Pckt3. In certain embodiments, the substantially similar packets may comprise a significant number of packets from each VM having identical payloads. For the purposes of this disclosure, a significant number of packets having identical payloads comprises a number of packets sufficient to provide an increase of 20% the number of packets having identical payloads in a VM versus when VMs are randomly allocated.

Additionally, in instances where host cache resource is a limiting resource of the host, by migrating the similar virtual machines, Host 1 now has available resources to host an additional virtual machine (VM5).

Figure 4:
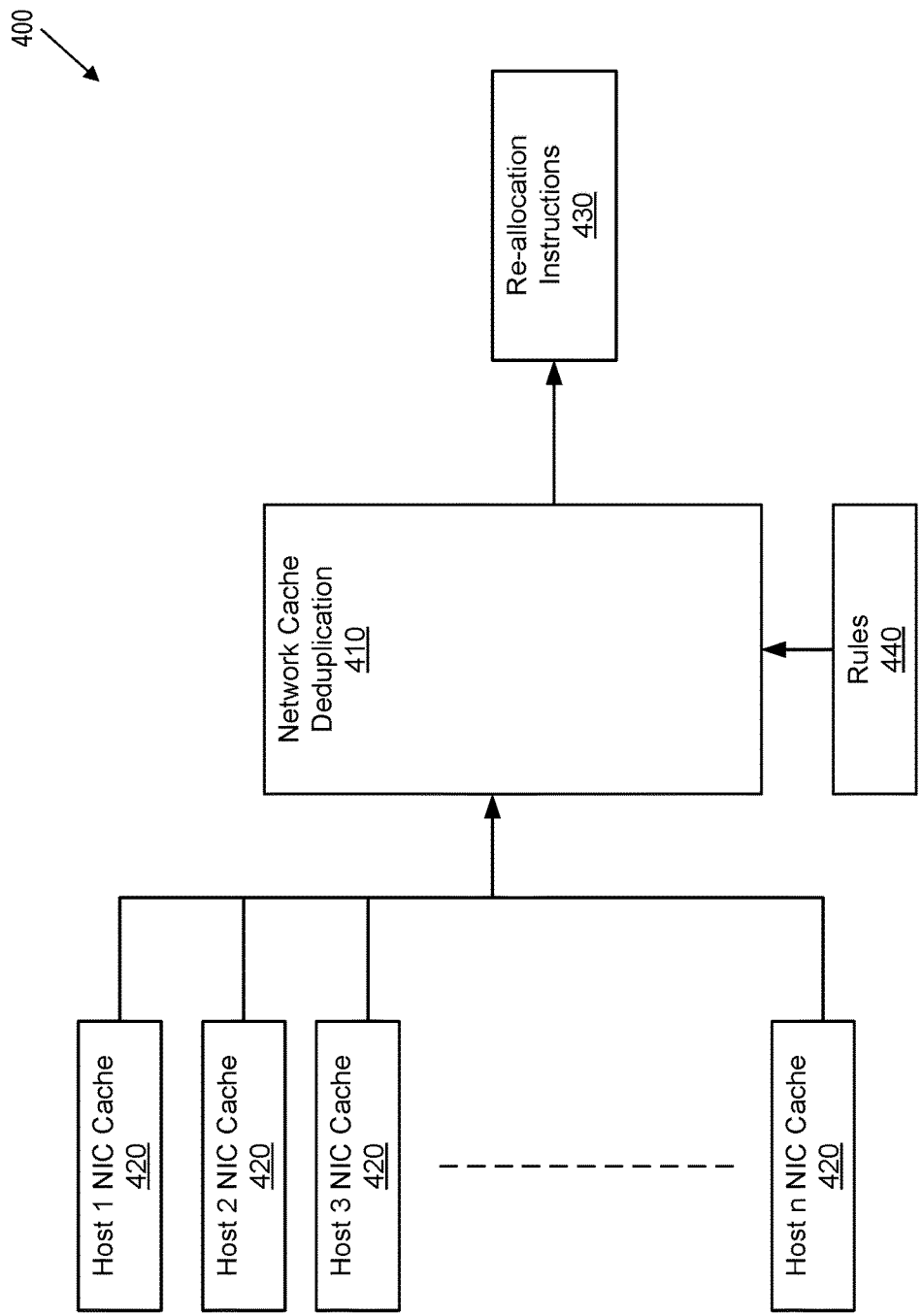
FIG. 4 shows a block diagram of a network cache deduplication device.

Aspects of the present disclosure appreciate that a challenge when optimizing caching in a virtualized networked environment relates to providing a host with an ability to determine if a packet is received from another network destination is unchanged without actually transferring the packet from the other destination. Accordingly, in certain embodiments, the network cache control module 218 includes a load balancer module which performs a load balancer operation. More specifically, within the virtualized network environment 300 caching occurs on the basis that the cache is a read cache for traffic within a cluster of nodes. The load balancer module maintains a per-cluster list of hashes of operating system (OS) file-system level blocks. The load balancer module also track changes to any of the file-system level blocks. Packet inspection is used to populate the cache and inspect packets to determine whether a block has changed at the OS file-system level. The cache is invalidated if an OS file-system block has changed or if a normal caching algorithm (e.g., a least recently used (LRU) type algorithm) dictates that the block hash should no longer be present in the cache. FIG. 4 shows a block diagram of a network cache deduplication environment 400. More specifically, the network cache deduplication environment 400 includes a network cache deduplication device 410 which monitors the contents of a plurality of host NIC caches 420. In certain embodiments, the network cache deduplication device 410 monitors the contents of all host NIC caches 420 within a cluster. The network deduplication device re-allocates virtual machines within the cluster by generating re-allocation instructions 430 to be applied to one or more virtual machines. In certain embodiments, the network deduplication device re-allocates virtual machines within the cluster based upon one or more rules for virtual machine re-allocation 430. In certain embodiments, the network cache deduplication device 410 identifies when network utilization is a cluster resource bottleneck and where opportunities are available for improved usage of any host NIC caches 420 within the cluster. The rules maximize cache utilization by placing VMs that cache similar packet payloads onto the same host. In certain embodiments, packets are evaluated to maximize total cache usage. Minimization of cache usage frees up additional cache space for caching of more packets, which results in reduced network traffic, thus allowing VMs to execute on a minimum number of nodes.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a virtualized network environment cache control operation, comprising:
analyzing network traffic of a plurality of virtual machines executing on a plurality of hosts within the virtualized network environment, each of the plurality of hosts comprising a network cache, the analyzing network traffic comprising monitoring content of the network cache of each of the plurality of hosts, the content of the network cache comprising respective network packets;
identifying whether more than one virtual machine includes a similar network traffic pattern, the similar network traffic pattern comprising identical respective network packets;
configuring a first virtual machine and a second virtual machine to execute on a common host, the first virtual machine and the second virtual machine having the similar network pattern; and,
determining whether the configuring the first virtual machine and the second virtual machine results in increased cache usage of the cache of the common host prior to performing the configuring.

2. The method of claim 1, wherein:
the first virtual machine was executing on the common host prior to the identifying; and,
the configuring the first virtual machine and the second virtual machine comprises migrating the second virtual machines to execute on the common host.

3. The method of claim 1, wherein:
the plurality of hosts comprise a cluster of information handling systems.

4. The method of claim 1, further comprising:
executing a third virtual machine on a third host, the third host having a dissimilar network traffic pattern when compared to the traffic patterns of the first and second virtual machines.

5. The method of claim 1, wherein:
the configuring the first virtual machine and the second virtual machine comprises re-allocating virtual machines within a cluster, the re-allocating being based upon at least one rule for virtual machine re-allocation.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
analyzing network traffic of a plurality of virtual machines executing on a plurality of hosts within the virtualized network environment, each of the plurality of hosts comprising a network cache, the analyzing network traffic comprising monitoring content of the network cache of each of the plurality of hosts, the content of the network cache comprising respective network packets;
identifying whether more than one virtual machine includes a similar network traffic pattern, the similar network traffic pattern comprising identical respective network packets;
configuring a first virtual machine and a second virtual machine to execute on a common host, the first virtual machine and the second virtual machine having the similar network pattern; and,
determining whether the configuring the first virtual machine and the second virtual machine results in increased cache usage of the cache of the common host prior to performing the configuring.

7. The system of claim 6, wherein:
the first virtual machine was executing on the common host prior to the identifying; and,
the configuring the first virtual machine and the second virtual machine comprises migrating the second virtual machines to execute on the common host.

8. The system of claim 6, wherein:
the plurality of hosts comprise a cluster of information handling systems.

9. The system of claim 6, wherein the instructions are further configured for:
executing a third virtual machine on a third host, the third host having a dissimilar network traffic pattern when compared to the traffic patterns of the first and second virtual machines.

10. The system of claim 6, wherein:
the configuring the first virtual machine and the second virtual machine comprises re-allocating virtual machines within a cluster, the re-allocating being based upon at least one rule for virtual machine re-allocation.

11. A non-transitory, computer-readable storage medium embodying computer program code, the computer program code comprising computer executable instructions configured for:
analyzing network traffic of a plurality of virtual machines executing on a plurality of hosts within the virtualized network environment, each of the plurality of hosts comprising a network cache, the analyzing network traffic comprising monitoring content of the network cache of each of the plurality of hosts, the content of the network cache comprising respective network packets;
identifying whether more than one virtual machine includes a similar network traffic pattern, the similar network traffic pattern comprising identical respective network packets;
configuring a first virtual machine and a second virtual machine to execute on a common host, the first virtual machine and the second virtual machine having the similar network pattern; and,
determining whether the configuring the first virtual machine and the second virtual machine results in increased cache usage of the cache of the common host prior to performing the configuring.

12. The non-transitory, computer-readable storage medium of claim 11, wherein:
the first virtual machine was executing on the common host prior to the identifying; and,
the configuring the first virtual machine and the second virtual machine comprises migrating the second virtual machines to execute on the common host.

13. The non-transitory, computer-readable storage medium of claim 11, wherein:
the plurality of hosts comprise a cluster of information handling systems.

14. The non-transitory, computer-readable storage medium of claim 11, wherein the computer executable instructions are further configured for:
   executing a third virtual machine on a third host, the third host having a dissimilar network traffic pattern when compared to the traffic patterns of the first and second virtual machines.

15. The non-transitory, computer-readable storage medium of claim 11, wherein:
   the configuring the first virtual machine and the second virtual machine comprises re-allocating virtual machines within a cluster, the re-allocating being based upon at least one rule for virtual machine re-allocation.

* * * * *